United States Patent [19]

Sung

[11] 3,904,567

[45] Sept. 9, 1975

[54] METHOD OF TREATING SYNTHETIC POLYMER LATEX OF STYRENEBUTADIENE OR POLYISOPRENE TO MAKE SOLID POLYMER DERIVED THEREFROM REDISPERSIBLE TO A LATEX

[75] Inventor: Chin Peng Sung, Kuala Lumpur, Malaysia

[73] Assignee: The Board of the Rubber Research Institute of Malaysia, Malaysia

[22] Filed: Aug. 21, 1973

[21] Appl. No.: 390,246

[30] Foreign Application Priority Data

Aug. 17, 1972  United Kingdom............. 38511/72

[52] U.S. Cl. .................. 260/23.7 R; 260/17.4 BB; 260/17.4 SG; 85.1

[51] Int. Cl.² ... C08C 4/00; C08L 5/00; C08L 9/00; C08L 91/00

[58] Field of Search............... 260/17.4 BB, 17.4 R, 260/17.4 SG, 29.7 EM, 85.1, 29.6 PM, 760, 23.7 A, 23.7 R, 29.7 N, 29.7 PT

[56] References Cited
UNITED STATES PATENTS

| | | | |
|---|---|---|---|
| 1,826,900 | 10/1931 | Schrader | 260/760 |
| 1,938,078 | 12/1933 | Iver | 260/760 |
| 2,658,044 | 11/1953 | Anderson | 260/23.7 |
| 2,880,184 | 3/1959 | Groves et al. | 260/29.7 |
| 2,963,452 | 12/1960 | Sinn et al. | 260/29.7 |
| 3,232,899 | 1/1966 | Guziak | 260/29.6 PM |
| 3,288,741 | 11/1966 | Cheng | 260/85.1 |
| 3,413,247 | 11/1968 | Schroeder | 260/17 |

OTHER PUBLICATIONS

Surface Active Agents and Detergents, Vol. II, Schwartz et al., pp. 328–329 and 738–739.

*Primary Examiner*—Melvin Goldstein
*Assistant Examiner*—Edward Woodberry
*Attorney, Agent, or Firm*—Wenderoth, Lind & Ponack

[57] ABSTRACT

A method of treating synthetic polyisoprene and styrene butadiene latices comprising adding to the latex particular redispersing agents so that the solid rubber obtained when the water is removed from the latex is redispersible. Various redispersing agents are described including urea and combinations of urea with supplementary agents. Reconstituted latices obtained from such redispersible solid rubbers have comparable properties with freshly prepared latices.

10 Claims, No Drawings

METHOD OF TREATING SYNTHETIC POLYMER LATEX OF STYRENEBUTADIENE OR POLYISOPRENE TO MAKE SOLID POLYMER DERIVED THEREFROM REDISPERSIBLE TO A LATEX

The present invention relates to the preservation of synthetic rubber latex in the form of re-dispersible solids or low moisture content pastes.

Synthetic rubber in the form of its latex is an important material particularly in the production of soft and foamed rubber goods, the manufacture of which is frequently performed in places far removed from the source of the latex. The present invention is directed in part to the provision of latices in solid form which are particularly convenient for transport and for the preparation of for example foam materials on site.

Further the solid latices are believed to be useful in the manufacture of so called "flexible plasters."

The present invention provides a method of making a solid or pasty synthetic rubber which is dispersible in water, which method comprises providing a latex of the synthetic rubber in admixture with a re-dispersing agent, and removing water from the latex The invention also includes synthetic rubber in solid or paste form which contains a re-dispersing agent and is dispersible in water.

Whilst it is believed that the invention is, in general, applicable to a wide range of synthetic rubbers, it has been found that it is particularly applicable to styrene-butadiene rubber (SBR) and polyisoprene rubber. Because of the slightly differing surface properties of the latex particles of these rubbers, there are some differences in the compounds found to be completely effective in these two types of synthetic latices. Among SBR latices those prepared by emulsion polymerisation (e.g. Intex 100) are preferred and among polyisoprene latices those prepared by solution polymerisation (e.g. Cariflex IR 700) are preferred.

While it will normally be preferred to use the minimum quantity of re-dispersing agent necessary to confer adequate re-dispersibility on the solid rubber, there is no reason in principle why greater amounts of re-dispersing agent should not be used. The maximum concentration of re-dispersing agent is thus not critical, and will generally be that at which other properties of the rubber start to significantly deteriorate.

Styrene Butadiene Rubber

By this term, we mean elastomeric copolymers of styrene and butadiene, which copolymers may optionally contain minor proportions of other monomers copolymerised therewith.

Preferred re-dispersing agents for styrene-butadiene rubber latices are urea, polyhydric alcohols and mono- and di-saccharides. Generally, these re-dispersing agents are used in amounts of from 0.05% to 10% by weight on the weight of the dry rubber. Amounts below 0.1 phr may not be sufficient to achieve complete re-dispersibility of the solid or pasty rubber. Little added advantage is gained by the use of amounts above 5.0 phr.

Preferred polyhydric alcohols having at least 3 hydroxyl groups per molecule include glycerol, mannitol, sorbitol, quebrachitol and inositol. Pentaerythritol is less effective. Preferred saccharides include $d$ (+) glucose, fructose, $d$ (+) galactose, $L$ (+) arabinose, $d$ (−) arabinose, sucrose, $d$ (−) mannose and lactose.

In general, where mixtures are used there is no need to add supplementary agents over and above the fatty acid soap level normally used in the production of SBR latices. Attention is drawn to the publication entitled "Description of Synthetic Rubbers and Latices" published by the International Institute of Synthetic Rubber Producers Inc., 45 Rockefeller Plaza, New York, N.Y. 10020 1968 — Jan — edition, wherein it is noted that four types of emulsifying systems are used in the production of SBR latex. These are fatty acid, rosin-acid, a mixture of a fatty acid and a roxin-acid and salt acid. The experiments made so far have been using a SBR latex which contained a fatty acid soap emulsifying system. The results have indicated that the further addition of a rosin-acid soap to the SBR latex used in the experiments, interferes with the re-dispersibility of the rubber. This is illustrated in Example No. 7. It is accordingly preferred in the present invention to prepare the redispersible rubber of the invention from a latex substantially free from rosin-acids.

Polyisoprene Rubber

By this term we mean an elastomeric polymer of polyisoprene, either cis- or trans-polyisoprene or a mixture of the two, either a homopolymer or a co-polymer of a major proportion of polyisoprene with a minor proportion of another co-polymerisable monomer.

Preferred re-dispersing agents for polyisoprene rubber latices are either saponin alone, or a mixture of a. at least one compound selected from glycosides, polyhydric alcohols, urea, and mono- and di-saccharides, with b. at least one alkali metal or ammonium salt of an organic acid having a $C_7$ to $C_{30}$ aliphatic carbon chain.

Generally, the re-dispersing agent is used in an amount of from 2 to 20 phr. Saponin is very effective alone in concentrations of the order of 10 phr. Where mixtures are used, each component is preferably present in an amount of at least 1 phr., and the mixture in an amount of at least 3 phr.

Examples of suitable glycosides are the saponins and digitonin. Preferred polyhydric alcohols in clude glycerol, mannitol, sorbitol, quebrachitol and inositol. Preferred saccharides include $d$ (+) glucose, fructose, $d$ (+) galactose, $L$ (+) arabinose, $d$ (−) arabinose, sucrose, $d$ (−) mannose, and lactose.

Among compounds of group b) above, there may be mentioned potassium palmitate; potassium oleate; the ammonium, sodium and potassium salts of capric, caprylic, lauric, stearic, ricinoleic and linoleic acids either by themselves or in various combinations as they would occur in natural vegetable oil soaps, e.g. coconut oil soap and castor oil soap; and the agent sold by ICI under the Trade Mark Vulcastab LS, believed to be sodium oleyl para-anisidine sulphonate.

The method used to dry the treated latex is not critical but in commercial operation the normal spray drying techniques are satisfactory. The specific examples use a laboratory method of drying the rubber as thin films on glass plates. The general technique used throughout the examples, unless otherwise specified, is as follows:

The redispersing agent either in aqueous solution or dispersion, typically at about 10% by weight, or as the free material, is added to portions of the synthetic rubber latex and the mixture is thoroughly stirred. The mixture is spread onto glass plates and dried in air at 29°C (ambient temperature) typically for from 48 to 54 hours, producing films about 2.5 mm. thick. The typical moisture content is from 0.8% to 2.0%. A typical average figure is 1.8%. The dried paste is removed from the glass plate with a spatula. The rubber is then redispersed in a minimum amount of water by high speed stirring in a commercial liquidiser for ca 30 seconds. The redispersibility can be quantitatively assessed by determining the quantity retained by seiving through fine muslin.

In the Examples, Examples 1 to 7 relate to SBR latex and Examples 8 to 10 polyisoprene latex.

The SBR latex used in the examples is a commercial type sold under the trade name Intex 100. The polyisoprene latex is a commercial cis-1,4-polyisoprene latex sold under the trade name Cariflex IR 700.

EXAMPLE 1

Samples of styrene-butadiene latex were treated with (a) 1.5% by weight glycerol as a 10% aqueous solution and (b) 2% by weight commercial brown sugar, both percentages being by weight on the weight of the dry rubber. The reconstituted latices had the following properties:

| Treatment | Dry rubber content (% wt.) | Total solids % wt. | pH | Mechanical stability time (sec) | Brookfield viscosity (cps) |
|---|---|---|---|---|---|
| SBR control (Intex 100 or 105) | 66.14 | 68.72 | 9.60 | 2000 | 765 |
| Re-dispersed SBR treated with 1.5% wt. glycerol | 65.10 | 68.82 | 10.00 | 2000 | 745 |
| Re-dispersed SBR treated with 2% wt. commercial brown sugar | 63.44 | 65.59 | 9.90 | 2000 | 420 |

Electron micrographs of these re-constituted latices show no observable differences between the reconstituted and control.

The latices were compounded using the following formulations:

| | Parts by weight dry |
|---|---|
| Latex | 100.0 |
| Zinc oxide | 5.0 |
| Zinc diethyldithiocarbamate | 1.0 |
| Zinc mercaptobenzothiazole | 1.0 |
| Antioxidant | 1.0 |
| Sulphur | 2.5 |
| Foaming agent (potassium oleate) | 1.0 |
| Trimene base | 1.0 |
| Sodium silicofluoride | 5.0 |

Foams were made from unmatured latex and no filler was added. Vulcanisation was carried out at 100°C for 30 minutes and drying for 16 hours at 70°C. The samples were tested according to the technique described in the appropriate British Standards specifications. The results are given below.

| | Control SBR | Re-dispersed SBR treated with 1.5% wt. glycerol | Re-dispersed SBR treated with 2% wt. commercial brown sugar |
|---|---|---|---|
| Density, D (gm cm$^{-3}$) | 0.114 | 0.105 | 0.107 |
| Volume shrinkage % | 14.2 | 15.5 | 12.7 |
| Compression modulus, C (gm cm$^{-2}$) | | | |
| Single flex | 55.9 | 44.3 | 49.1 |
| Initial | 55.8 | 42.9 | 49.1 |
| Fatigued | 54.8 | 41.4 | 47.6 |
| Aged 22hr/70°C | 67.0 | 56.6 | n.d. |
| Fatigue loss % | 1.8 | 3.5 | 2.9 |
| Age hardening % | 20.0 | 32.0 | n.d. |
| C/D 2.5 Single flex | 12.6 | 12.5 | 13.0 |
| Initial | 12.6 | 12.1 | 13.0 |
| Fatigued | 12.4 | 11.7 | 12.7 |
| Aged 22 hr/70°C | 15.1 | 16.0 | n.d. |
| Compression set | | | |
| Static 72 hr/20°C | 2.2 | 3.4 | 1.5 |
| Static 22 hr/70°C | 7.4 | 7.6 | 5.2 |
| Dynamic | 1.1 | 1.5 | 1.1 |
| Tensile strength kg cm$^{-2}$ | 0.70 | 0.64 | 0.59 |
| Elongation at break % | 205 | 170 | 153 | n.d. = not determined

Using the same technique further samples were prepared and the data thus obtained indicate that the addition of as much as 5% by weight glycerol or the commercial grade of brown sugar to SBR latex do not adversely affect the properties of the raw latex.

EXAMPLE 2

This Example illustrates the effect of adding urea, at various concentrations, on the redispersibility of SBR latex.

| Concentration phr | Appearance on addition of water to dry rubber | Coagulum content % wt |
|---|---|---|
| Control | Film was coherent. | 100 |
| 0.1 | Film was partially coherent. Milkiness noted after 20 minutes. Partially re-dispersible | 54 |
| 0.3 | Film was completely non-coherent; immediate milkiness on addition of water. | 4 |
| 0.7 | Film was completely non-coherent; immediate milkiness on addition of water. | 0 |
| 1.0 | Completely redispersible. | 0 |

As in Example 1 a sample of styrene-butadiene latex was treated with 3% by wt. of urea. The reconstituted latex had the following properties:

| Treatment | Total Solids % wt. | pH | Mechanical stability time (sec) |
|---|---|---|---|
| SBR control (Intex 100) | 68.87 | 9.82 | 2000 |
| Re-dispersed SBR treated with 3% urea | 67.90 | 9.55 | 2000 |

The latices were compounded to the formulation described in Example 1 and the properties of the foam rubber are shown below

| | Control SBR | Re-dispersed SBR treated with 3% wt. urea |
|---|---|---|
| Density, D (gm. cm$^{-3}$) | 0.125 | 0.117 |
| Volume shrinkage % | 12.9 | 14.9 |
| Compression modulus, C (gm. cm$^{-2.5}$) | | |
| Single flex | 79.6 | 64.7 |
| Initial | 80.3 | 66.2 |
| Fatigued | 77.7 | 64.3 |
| Fatigue loss % | 3.3 | 2.9 |
| C/D$^{2.5}$ Single flex | 14.5 | 13.7 |
| Initial | 14.6 | 14.1 |
| Fatigued | 14.1 | 13.6 |
| Compression set | | |
| Static 72 hr/20°C | 2.2 | 3.0 |
| Dynamic | 1.1 | 1.1 |

EXAMPLE 3

This Example illustrates the effect of adding Glucose, at various concentrations, on the redispersibility of SBR Latex.

| Concentration phr | Appearance on addition of water to dry rubber | Coagulum content % wt. |
|---|---|---|
| Control | Film was coherent | 100 |
| 0.2 | Films were completely non-coherent, a very milky dispersion of latex particles. | 0 |
| 0.4 | | 0 |
| 0.8 | | 0 |

Similar results were obtained with the following monosaccharides: fructose, d-mannose, d-galactose, l-arabinose and d-arabinose.

EXAMPLE 4.

This Example illustrates the effect of adding Sucrose, at various concentrations, on the redispersibility of SBR Latex.

| Concentration phr | Appearance on addition of water to dry rubber | Coagulum content % wt. |
|---|---|---|
| Control | Film was coherent | 100 |
| 0.2 | Film was partially coherent. Milky dispersion of latex particles. Partial re-dispersibility of the rubber was evident. | 10 |
| 0.4 | Film was completely non-coherent. Milky dispersion of latex particles. | 0 |
| 0.8 | Complete redispersibility. | 0 |

Similar results were obtained with lactose.

EXAMPLE 5

This Example illustrates the effect of adding Glycerol, at various concentrations, on the redispersibility of SBR Latex.

The effectiveness of glycerol in redispersing SBR is evident from the above results. Glycerol mono-oleate, mono-ricinoleate and mono-stearate were also experimented at concentrations between 3 – 10 phr, but the effects on redispersibility were not similar to that of glycerol. Large flocs of rubber particles were observed and re-dispersion was incomplete even at such high concentrations. Glycerol diacetate was also found to be ineffective even at concentrations of 2 – 10 phr.

| Concentration phr | Appearance on addition of water to dry rubber | Coagulum content % wt. |
|---|---|---|
| 0 | Film was coherent | 100 |
| 0.2 | Films were completely non-coherent. Immediate milkiness on addition of water. | 0 |
| 0.4 | | 0 |
| 0.8 | | 0 |

EXAMPLE 6

This Example illustrates the effect of adding Mannitol, at various concentrations, on the redispersibility of SBR Latex.

| Concentration phr | Appearance on addition of water on dry rubber | Coagulum content % wt. |
|---|---|---|
| 0 | Film was coherent | 100 |
| 0.2 | Film was mainly non-coherent. Immediate milkiness on addition of water. Almost complete re-dispersibility. | 2 |
| 0.4 | Films were completely non-coherent. Immediate milkiness on addition of water. Complete re-dispersibility. | 0 |
| 0.8 | | 0 |

Similar results were obtained with sorbitol, meso-inositol and quebrachitol.

EXAMPLE 7

This Example illustrates how certain emulsifiers present in commercial SBR Latex can interfere with the re-dispersion of latices according to the invention.

SBR latex (under the trade name of Intex 100 which contains 7.5% potassium oleate) was treated with 1 phr glucose and divided into seven equal portions. To each portion was added 0–5 phr of a commercial rosin-acid soap. The latices were separately dried on glass plates as described above. Water was added to the dry films and coagulum contents were determined. Results are shown in the following table.

| Addition of potassium rosin-acid soap | Coagulum content % wt. | Re-dispersibility % |
|---|---|---|
| 0 | 0 | 100 |
| 0.5 | 0 | 100 |
| 1.0 | 0 | 100 |
| 2.0 | 7 | 93 |
| 3.0 | 24 | 76 |
| 4.0 | 100 | 0 |
| 5.0 | 100 | 0 |

It is clear that the addition of 2 phr of potassium rosin-acid soap to a treated SBR latex interferes with the re-dispersibility of the rubber. Potassium palmitate interferes, to a lesser extent, with the redispersibility of the rubber as illustrated in the following table.

| Addition of potassium palmitate (phr) | Coagulum content % wt. | Redispersibility % |
|---|---|---|
| 0 | 0 | 100 |
| 1 | 0 | 100 |
| 2 | 0 | 100 |
| 3 | 12 | 88 |
| 4 | 12 | 88 |

EXAMPLES 8 TO 10

Using the method described above the effectiveness of various redispersing agents on Cariflex IR 700 latex.

The supplier of Cariflex IR 700 has stated that a potassium soap of rosin-acid was used in the production of this latex. Rosin-acid is sometimes described as a "monocarboxylic acid of an alkylated hydrophenanthrene nuclei". The type used in Cariflex IR 700 is the abietic acid type. Approximately 2 percent of this soap is present in Cariflex IR 700. This figure has been confirmed by analysis.

Table

| Component (a) | Component (b) | Appearance on addition of water to dry rubber | Coagulum content % wt. |
|---|---|---|---|
| Control rubber Nil | Nil | Film was coherent | 100 |
| Example 8. Effect of saponin | | | |
| 10 phr saponin | Nil | Film was completely non-coherent. Milky dispersion of latex particles. | 0 |
| 8 phr saponin | 5 phr Vulcastab L.S. | do. | 0 |
| 0 phr saponin | 5 phr Vulcastab. | Film was coherent. | 100 |
| Example 9. Effect of mono-saccharide | | | |
| 2 phr glucose | 5 phr potassium oleate | Film was completely non-coherent. Milky dispersion of latex particles. | 0 |
| Nil | 5 phr potassium oleate | Film coherent. | 100 |
| 2 phr glucose | Nil | do. | 100 |
| Example 10. Effect of polyhydric alcohol | | | |
| 2 phr glycerol | 3 phr potassium oleate | Film was completely non-coherent. Milky dispersion of latex particles. | 0 |
| 2 phr glycerol | nil | Film coherent | 100 |

I claim:

1. A method of making a solid or pasty synthetic styrene-butadiene rubber which is dispersible in water, which method comprises adding at least 0.05% by weight of urea, as a re-dispersing agent, to a styrene-butadiene rubber latex and removing water from the latex.

2. A method as claimed in claim 1, wherein the styrene butadiene rubber is made by an emulsion polymerisation process.

3. A method as claimed in claim 1 wherein the proportion of re-dispersing agent is from 0.1 to 10% by weight on the weight of the dry rubber.

4. A solid or pasty styrene butadiene rubber which is dispersible in water and comprises styrene butadiene rubber mixture with at least 0.05% by weight urea as a re-dispersing agent.

5. A method of making a solid or pasty synthetic polyisoprene rubber which is dispersible in water, which method comprises adding
   a. at least 1% by weight of urea, and
   b. at least 1% by weight of at least one alkali metal or ammonium salt of an organic carboxylic or sulphonic acid having a C7 to C30 aliphatic carbon chain, as a re-dispersing agent, to a synthetic polyisoprene rubber latex and, removing water from the latex.

6. A method as claimed in claim 5, wherein the polyisoprene is prepared by solution polymerisation.

7. A method as claimed in claim 5, wherein the sum of urea and the alkali metal or ammonium salt of the organic acid is from 2 to 20% by weight on the weight of the dry rubber.

8. A solid or pasty polyisoprene rubber which is dispersible in water and comprises polyisoprene rubber in admixture with (a) at least 1% by weight of urea, (b) at least 1% by weight of at least 1 alkali metal or ammonium salt of an organic carboxylic or sulphonic acid having a C7 to C30 aliphatic carbon chain, as a re-dispersing agent.

9. A method as claimed in claim 5, wherein the salt of the organic acid is sodium oleyl para-anisidine sulphonate.

10. A method as claimed in claim 5, wherein the salt of the organic acid is selected from the group consisting of potassium palmitate, potassium olelate, and the ammonium, sodium, and potassium salts of capric, caprylic, lauric, stearic, ricinoleic linoleic acids and mixtures thereof.

* * * * *